United States Patent
Hara et al.

(10) Patent No.: US 7,270,864 B2
(45) Date of Patent: Sep. 18, 2007

(54) OPTICAL INFORMATION RECORDING MEDIUM

(75) Inventors: Fumi Hara, Nakamuroda Haruna-machi (JP); Sachiko Ishibashi, Nakamuroda Haruna-machi (JP); Masashi Satoh, Nakamuroda Haruna-machi (JP); Toru Fujii, Nakamuroda Haruna-machi (JP); Yuji Arai, Nakamuroda Haruna-machi (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 187 days.

(21) Appl. No.: 11/238,313

(22) Filed: Sep. 29, 2005

(65) Prior Publication Data

US 2006/0068153 A1    Mar. 30, 2006

(30) Foreign Application Priority Data

Sep. 30, 2004    (JP) .............................. 2004-286295

(51) Int. Cl.
*B32B 3/02*    (2006.01)

(52) U.S. Cl. ................... 428/64.1; 428/64.4; 428/64.8; 430/270.14

(58) Field of Classification Search ............... 428/64.1, 428/64.4, 64.8; 430/270.14
See application file for complete search history.

(56) References Cited

FOREIGN PATENT DOCUMENTS

| JP | 9-69239 | 3/1997 |
| JP | 205293646 | * 10/2005 |

* cited by examiner

*Primary Examiner*—Elizabeth Mulvaney
(74) *Attorney, Agent, or Firm*—Knobbe Martens Olson & Bear, LLP

(57) ABSTRACT

For improving the jitter property and ensuring the high reliability of an optical disk, a metal film containing phosphorus is disposed in a reflective layer. The layer has a hardness of 60 mgf/μm² or more as nano indentation hardness, and an adhesive layer used for bonding has a glass transition temperature of 100° C. or higher but 200° C. or lower, an elastic modulus at 25 to 80° C. of 1000 MPa or more, and an adhesion strength of 4N or more. The dye for the dye recording layer has a water solubility of 20% or less as measured as light absorbance of hot water in which the dye recording layer is soaked.

13 Claims, No Drawings

OPTICAL INFORMATION RECORDING MEDIUM

BACKGROUND OF THE INVENTION

1. Field of the Invention

The present invention concerns a write-once type optical information recording medium having excellent recording characteristics.

2. Description of the Related Art

Write-once type optical information recording media, such as bonded optical disks have been well known including, (i) those formed by opposing, for example, an optical disk having, on a transparent substrate, a layered structure contains a dye recording layer, a reflective layer and, optionally, a protective layer and another optical disk of an identical layered structure or a different layered structure containing at least the dye recording layer, followed by bonding the optical disks to each other by way of an adhesive, with the layered structures thereof being opposed to each other, or (ii) those in which a pair of transparent substrates per se are directly opposed and bonded to each other by way of an adhesive, in which information can be recorded or reproduced by applying a light of a semiconductor laser at a waveform of from 400 to 670 nm for CVD or applying a light of a semiconductor laser at a longer wavelength for CD-R on the side of a main surface as described in JP-A No. 9-69239.

SUMMARY OF THE INVENTION

Compared with a reflective layer consisting of Ag, the known reflective layer comprising silver alloys such as Ag—Cu—In or Ag—Cu—Zn described in JP-A No. 9-69239 can outstandingly increase the resistance to oxidation and corrosion and are hardened to prevent the migration of the dye recording layer disposed therebelow by the effect of additive elements, and can ensure high reliability. The optical disk having the reflective layer is excellent in a so-called high temperature and high humidity resistance test reliability in that the recording/reproducing performance is not degraded even put under a high temperature and high humidity circumstance. On the other hand, however, the heat conductivity and the reflectance of the optical disk are lowered and it is difficult, in this regard, to improve the recording/reproducing characteristics, particularly, jitter.

For the improvement of the recording/reproducing performance of the optical disk, however, little discussion has been made to hardness of the reflective layer and physical property values of other constituent portions, or to physical property values related to the peeling between the substrates of optical disks having a bonded structure.

Consequently, in an embodiment, an object of the present invention is to provide an optical information recording medium which is capable of providing high reflectance and high heat conductivity while sufficiently improving its hardness by using an alloy film with a micro amount of additive elements for the reflective layer without lowering the reflectance and the heat conductivity, and which is also capable of obtaining recording/reproducing characteristics by using a silver alloy film, which are equal with or superior to those obtained by a pure silver film.

In another embodiment, an object of the invention is to provide an optical information recording medium which is capable of reducing the thickness of a reflective layer due to sufficient hardness of the reflective layer and which is capable of improving the productivity and the cost reduction.

In still another embodiment, an object of the invention is to provide an optical information recording medium capable of coping with an increased recording operation speed, improved recording/reproducing performances, particularly, initial jitter, and high reliability (high temperature resistance and high humidity resistance test reliability, or humidity resistance reliability).

In order to attain the foregoing objects, the present invention provides, in a first aspect, an optical information recording medium having each of layers including a recording layer and a reflective layer, in which information is to be recorded or is recorded on the dye recording layer by a recording light or is reproduced therefrom by a reproducing light through the transparent substrate, wherein the reflective layer has a metal film containing a phosphorus component.

In a preferred embodiment of the invention, the reflective layer has a hardness of 60 mgf/$\mu$m$^2$ or more as nano indentation hardness.

In another embodiment, the dye recording layer has a dye dissolving property to water such that after the dye recording layer (which can be a dye composition coated on a polycarbonate substrate of 2.5 cm square for testing purposes) is dipped in 5 ml of hot water at 75° C. for 60 min, absorbance of the hot water at a maximum absorbance wavelength is 20% or less (which may also be expressed as 0.2 or less).

Further, the invention provides, in another aspect, an optical information recording medium including a pair of disks opposed to each other, each having a transparent substrate and layers including a dye recording layer and a reflective layer, in which information is to be recorded or is recorded on the dye recording layer by a recording light or is reproduced by a reproducing light through the transparent substrate, in which the disks are bonded by way of an adhesive layer (respective sides where the respective reflective layers are formed face each other), wherein the reflective layer has a metal film containing a phosphorus component and the reflective layer has a hardness of 60 mgf/$\mu$m$^2$ or more as nano indentation hardness.

In a preferred embodiment of another aspect of the invention, the adhesive layer has a temperature property for elastic modulus that is a glass transition temperature of 100° C. or higher but 200° C. or lower in view of changes of elastic modulus relative to temperature.

In another embodiment, the elastic modulus of the adhesive layer at 25 to 80° C. is preferably 1000 MPa or more.

In still another embodiment, the dye recording layer preferably has a dye dissolving property to water such that after the dye recording layer (which can be a dye composition coated on a polycarbonate substrate of 2.5 cm square for testing purposes) is dipped in 5 ml of hot water at 75° C. for 60 min, absorbance of the hot water at a maximum absorbance wavelength is 20% or less.

In yet another embodiment, the adhesive layer preferably has an adhesion strength property such that a load value for initiating peeling of the pair of transparent substrates from each other is 4 N or more, in a case where the paired substrates are each formed into a disk (240-mm diameter, 0.6-mm thickness) having layers formed thereon and are opposed and bonded to each other by way of the adhesive layer; a rigid thin film metal piece is inserted in a gap between the pair of transparent substrates including the layers at an inner circumference thereof; and a load is applied only to a lower portion while fixing an upper portion. The above test can be performed on final products in the same manner as above.

According to at least one embodiment of the invention, since the reflective layer having the metal film containing the phosphorus component is provided, high reflectance, high heat conductivity, and high hardness can be maintained for the reflective layer which is thereby capable of providing an optical information which can be coped with an increased recording speed, capable of improving the recording/reproducing performances, particularly, initial jitter, by improved heat dissipation due to the high heat conductivity, and capable of obtaining high reliability (high temperature resistance, high humidity resistance test reliability or humidity resistivity reliability) by preventing migration of the dye recording layer due to the hardness of the reflective layer.

Further, in at least one embodiment, it is possible to provide an optical information recording medium which is capable of having high reflectance and high heat conductivity while sufficiently improving its hardness by using an alloy film with a micro amount of additive elements for the reflective layer without lowering the reflectance and the heat conductivity, and which is also capable, in a silver alloy film, of obtaining recording/reproducing characteristics comparable with or superior to those obtained by a pure silver film. In addition, it is possible to provide an optical information recording medium which is capable of reducing the thickness of the reflective layer due to the improvement on the hardness of the reflective layer, and which is capable of improving the productivity and reducing the cost. In all of the aforesaid aspects and embodiments, any element used in an embodiment can interchangeably or additionally be used in another aspect or embodiment unless such a replacement or addition is not feasible or causes adverse effect. Further, the present invention can equally be applied to products and methods. Further, the aforesaid layer structures are not intended to limit the present invention, and any suitable layers can be added between any of the aforesaid layers. For example, the term "formed on" means "formed directly or indirectly on".

Further, the aforesaid characteristics can be determined using final products or test samples. For example, the characteristics of the dye recording layer can be determined using a sample formed by applying a dye composition on a substrate or using a final product by separating an upper layer from the dye recording layer and exposing the dye recording layer.

For purposes of summarizing the invention and the advantages achieved over the related art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

PREFERRED EMBODIMENT OF THE INVENTION

In the present invention, the optical information recording medium may be of any bonded type of optical disks using primarily or only optical laser light for recording and reproduction and using an opto-magnetic recording/reproducing system.

For example, the optical information recording medium may include, specifically, bonded type optical disks formed by arranging an optical disk (in which a dye recording layer, a metal reflective layer formed thereon, and optionally a protective layer formed thereon are disposed on one main surface of a transparent substrate, and a peelable protective layer is optionally disposed on the other main surface), opposite to another optical disk (in which all of the dye recording layer, the reflective layer and the optional protective layer (for example, of UV-curable resin) are disposed in the same manner as above), or an optical disk (in which a portion of the dye recording layer, the reflective layer and the protective layer is not disposed and other layers are disposed in the same manner as above), on the side of the main surface provided with each of the layers. The optical information recording medium may be bonded type optical disks formed by arranging any one of the optical disks described above and another optical disk configurated in the same manner as described above except that tracking guide grooves are previously formed in the transparent substrate and a dye recording layer is formed thereon. The optical information recording medium may also be bonded type optical disks formed by arranging any one of the optical disks described above opposite to another transparent substrate, and bonding them by way of an adhesive layer (respective sides where the layers are formed face each other, i.e., the layers are sandwiched between the two transparent substrates). For recording or reproducing information to and from them, a recording light or a reproducing light is entered on the side after the protection film is peeled therefrom or directly on the side in a case where the protective film is not disposed. Generally, in the case of using a laser light as a reproducing light, a semiconductor laser light at a wavelength of 400 to 670 nm is used for DVD±R or at a wavelength of 770 to 830 nm is used for CD-R, but other laser lights may also be used.

While the recording layer has the dye recording layer in the case described above, a read only optical disk such as CD is also available, in which the dye recording layer is not present, recording is conducted to the transparent substrate per se, and a reflective layer and a protective layer are successively stacked thereover. In this optical disk, a reproducing light is incident to the transparent substrate on the side opposite to the recorded site and information can be reproduced by row of recording pits formed on the transparent substrate and a reflective layer covering them. Also this optical disk can be used in the same manner as described above as one of optical disks in the bonded type optical disk.

In addition to the dye recording layer and the reflective layer, other layers, for example, a layer for improving the bondability between the layers described above and other adjacent layers, an oxygen impermeable layer comprising, for example, $SiO_2$ for improving the reliability in addition to information recording and, further, an antioxidation layer for preventing oxidation of the optical reflective layer may be interposed between the optical reflective layer and the protective layer.

In an embodiment, the protective layer disposed over the reflective layer is a layer for protecting an information recorded portion against external physical or mechanical disorders and the thickness is, preferably, within a range from 5 to 10 μm. Particularly, a protective layer comprising a UV-ray curable resin that can avoid undesired effects caused by heating to the substrate or the recording layer and can be formed in a short time upon forming the protective layer is preferred.

In an embodiment, the reflective layer has a metal film containing the phosphorus component. The reflective layer is formed by adding the phosphorus component to a film of a high reflectance material such as a metal film comprising an alloy of at least one of Au, Al, Ag, Cu, Pt, and the like or an alloy with further addition of micro ingredients other than those described above. For example, a metal film such as a silver alloy film comprising Ag and one or plurality of elements selected from the group consisting of Pd, In, Cu, Bi, Ca, Nd, Ni, and Zn can be used: for example, AGPdIn, AgZnCu, AgBi, AgCuPd, AgPd, AgCuCa, AgNdCu, AgCuNi, AgCuIn, AdCuZn, AgZn, AgCuBi, formed by vapor deposition, sputtering, etc. While In has an anti-sulfidation effect and Cu and Zn have an effect of improving the hardness, addition of the phosphorus component can provide an appropriate hardness, and add a performance of improving the hardness, for example, in each of the silver alloy films described above. By adding the phosphorus component to the metal film, for example, AgCuIn and AgCuZn, novel materials, i.e., Ag—Cu—P—In and Ag—Cu—P—Zn are obtained.

Incorporation of the phosphorus component to the metal film can provide a remarkable effect to silver alloy films in the case of no addition of P, in which the heat conductivity and the reflectance are lowered due to the other alloys alloyed with the silver alloy when compared particularly with a pure silver film. Further, the incorporation of the phosphorus component can prevent extreme lowering of the heat conductivity and the reflectance, and can also further improve the high hardness attributed to the alloyed silver alloy film due to the alloying, and outstandingly improve the resistance to oxidation and corrosion. The improvement of the hardness can suppress or prevent the migration of the dye recording layer as compared to the case of the pure silver film which is excessively soft and can not completely suppress the migration of the dye recording layer disposed therebelow, and can improve the recording/reproducing characteristics, particularly, initial jitter in the optical disk by suppressing or preventing the migration of the dye recording layer, and increasing the heat dissipation while taking advantage of the high heat conductivity and high reflectance inherent to the pure silver film.

The phosphorus component may be added in an extremely small amount and, for example, it is added by 0.05 to 0.15% by weight to the elemental metal or the metal in the alloy (Ag, Cu, Zn, etc.) (may be from 0.05 to 0.15% weight based on the base metal). In an embodiment, below the lower limit, no sufficient hardness may be obtained and, on the other hand, above the upper limit, lowering of the reflectance and lowering of the heat conductivity may sometimes occur due to the increase of the addition amount.

The phosphorus component can be added by forming a metal film such as a film of alloy by sputtering or vapor deposition under the presence of phosphorus.

In an embodiment, the reflective layer preferably has the following property (a).

(a) Hardness of 60 mgf/$\mu m^2$ or more as nano indentation hardness

The hardness of the reflective layer is particularly preferably 100 mgf/$\mu m^2$ or more. In a case where the hardness of the reflective layer is less than 60 mgf/$\mu m^2$, the reliability (suppression of the worsening of recording characteristics caused by dissolubility of the dye) may not sometimes be improved. The hardness of the reflective layer can be controlled by adjusting the composition of the alloy, e.g., from 60 to 200 mgf/$\mu m^2$ and, preferably, from 100 to 170 mgf/$\mu m^2$. At a lower hardness, fludization of the dye recording layer may not be effectively suppressed and, at a higher hardness, the heat conductivity and the reflectance may sometimes be lowered due to increase in the addition amount of phosphorus component.

The heat conductivity can also be controlled by adjusting the composition of the alloy, e.g., from 250 to 410 W/m·k and, preferably, from 300 to 400 W/m·k. At a low heat conductivity, the heat dissipation is deteriorated thereby possibly worsening the jitter. On the other hand, while high heat conductivity is generally preferred, since the heat conductivity of a silver alloy tends to be lowered to about 90% of pure silver due to another element added even in a extremely smaller amount, it is preferably 380 W/m·k or less.

The reflectance can also be controlled by adjusting the composition of the alloy, e.g., at 93% or more, preferably, 95% or more. At a low reflectance of the reflective layer, the reflectance of the medium (optical information recording medium) is also lowered, thereby sometimes deteriorating the characteristics. Further, while high reflectance is generally desirable, it is actually at about 98% in an embodiment.

Further, in an embodiment, it is preferred to have the following property (b).

(b) Dissolving property of the dye to water that is measured after a polycarbonate substrate of 2.5 cm square coated with a dye composition for the dye recording layer is dipped in 5 ml of hot water at 75° C. for 60 min, the absorbance of the hot water at the maximum absorbance wavelength is 20% or less.

The property (b) shows the dissolving property of the dye to water and in a case where the absorbance is 20% or less, preferably, 15% or less and, more preferably, 10% or less, a uniform and high density continuous thin film can be formed easily when a dye-containing solution is applied to form a dye recording layer which is able to perform highly fine recording and which is suitable for high speed recording.

As the dye capable of having the property (b), trimethine cyanine, etc. can preferably be used and specific products include NK-5134, NK-5907, NK-4741, and NK-4413 (manufactured by Nippon Kanko Shikiso Kenkyusho).

In an embodiment, the adhesive layer for the bonding preferably has the following property (c) and, more preferably, the following property (d) after drying or after curing.

(c) Temperature property of elastic modulus that is a glass transition temperature of 100° C. or higher but 200° C. or lower in view of changes of the elastic modulus relative to the temperature.

(d) Elastic modulus that is at least 1000 MPa at 25 to 80° C.

The upper limit of (d) may be defined as 5000 MPa. At a higher value, problems may possibly occur in terms of the peeling between the substrates due to a lack of desired adhesive strength. Further, in a case where it is lower than 1000 MPa, the humidity resistance reliability and the initial jitter may be worsened. In view of the above, it is preferably at least 1400 MPa, by which good humidity resistance reliability can be provided and the initial jitter can be improved.

The elastic modulus relative to the temperature (stress per unit elongation) shows a large rate of change in the course of transition from a glassy state to a rubbery state wherein the glassy state can be distinguished by the large rate of change from the rubbery state showing a small rate of change. A glass transition temperature exists within a temperature range corresponding to a curve showing a large rate of change, which is indicated by Tg.

With a view point of the dynamic viscoelasticity, while the dynamic storage modulus (G') representing the magnitude of the elastic factor of a polymer lowers along with increase of the temperature. While G' for a thermoplastic resin lowers continuously also in a rubbery region, G' for a crosslinked type polymer does not lower continuously in the rubber region but it remains unchanged or increases. On the other hand, a relation between the dynamic loss modulus (G") representing the magnitude of the viscosity factor of a polymer and the temperature is indicated by a curve having a maximal point. Further, a dynamic loss (loss tangent) tan δ (δ is a phase difference between the strength and the strain vector) can be measured based on the phase difference between the stress and the simple harmonic oscillation of strains, which is a scale representing the extent for the loss of the dynamic energy given to the system due to the heat generation.

The temperature showing a peak value for tan δ in curve G' is Tg (glass transition temperature) in dynamic measurement, which may be considered as a glass transition temperature Tg. The Tg can be made higher by increasing the crosslinking density or designing a polymer of higher nuclear structural density of, e.g., a phenyl nucleus. The Tg can be lowered by lowering the crosslinking density or by introducing, for example, an alkyl chain of a fatty acid to the polymer, or mixing a plasticizer. For the details, "Modern dye Dispersion Technique" (p 53 to 54, para. 2.1, published in 1993 from Technical Information Society) can be referred to and is incorporated by reference.

(d) is preferably (d)' described below.

(d)' Elastic Modulus can be 2500 MPa or more (particularly, 3000 MPa or more) and 5000 MPa or less at 25° C., and 1000 MPa or more (particularly, 2000 MPa or more) and 5000 MPa or less at 80° C. In a case where it is lower than a lower limit, problems may occur in the humidity resistance reliability or the jitter. On the other hand, when it is higher than 5000 MPa, it may result in a problem in that the adhesion strength is insufficient.

In this case, since the elastic modulus is optimized at 25° C. and 80° C. respectively, a good humidity resistance reliability can be provided due to the synergistic effect of the optimization and the initial jitter can also be improved. Particularly, in a case where the dye is highly water soluble, the effect can be provided reliably and can cope also with suitably increased recording speed.

In view of the properties (c) and (d) above, any suitable curing products of UV-ray curable resin composition can be used so far as the adhesives for the bonding do not show so high Tg as 100° C. and the elastic modulus at 25 to 85° C. do dot show so large as 1000 MPa, and the elastic modulus at each temperature (d)' is not so large as in the respective elastic modulus values described in (d)'. On the other hand, since the adhesive layer according to an embodiment of the invention can selectively use adhesives having the properties of (c) and (d) (particularly, (d)'), it is less affected by humidity and can be suppressed from deformation, and the initial jitter and the humidity resistance reliability in the optical disk can be free of deterioration.

The adhesive layer more preferably has the following property (e) in addition to the properties (c) and (d). (e) Adhesion strength property of the adhesive layer that is 4N or more as a load value just before peeling the pair of transparent substrates from each other, as measured when the paired substrates formed each into a disk of 240 mm diameter and 0.6 mm thickness and formed with layers (e.g., a dye-recording layer, reflective layer, and protective layer) are bonded by the adhesive layers, a thin film metal piece is inserted in a gap between the pair of transparent substrates at an inner circumference thereof, and a load is applied only to the lower portion.

The adhesive strength (e) is preferably 4N or more and, particularly preferably, 7N or more. In a case where it is less than 4N, the adhesion strength may be insufficient and peeling may sometimes occur between the substrates even by merely taking the bonded optical disk out of a containment case.

As described above, among (a) to (e), at least one or preferably a plurality of characteristics including (a) may be satisfied. By satisfying most of them, preferably all of them, the initial jitter or the humidity resistance reliability as the optical disk can further be improved due to the synergistic effect by optimizing the reflective layer, water solubility of the dye, the glass transition temperature, the elastic modulus, and the adhesion strength of the adhesive. Further, this can provide a bonded structure free of peeling upon taking the optical disk out of a storage case.

The adhesive capable of having the properties (c) to (e) described above may be either a non-curable or curable type. The curing type may be a thermosetting type (including a normal temperature setting type) or a UV-ray curing type. A (meth)acrylic resin composition may be mentioned for each type. The usable UV-ray curable resin compositions include, for example, light sensitive prepolymers (for example, those in which double bonds are introduced in a polymer such as polyester resin), photo-polymerization initiators, reactive diluents (for example, unsaturated monomer such as polyfunctional acrylate monomer) (thermosetting type adhesive may be obtained by using a heat polymerization catalyst instead of the photo-polymerization initiator) and include, for example, SD-694 (manufactured by Dai-Nippon Ink Chemical Industry Co.).

The glass transition temperature of the curing product and the elastic modulus at each of the predetermined temperatures of the composition can be controlled by introducing aromatic rings to a light sensitive prepolymer, increasing the density of double bonds, or selecting the type and the amount of use of a reactive diluent. The adhesion to the substrate can be improved by introducing functional groups to the light sensitive prepolymers or selecting the kind and the amount of use of the reactive diluent to provide the properties (c) to (e) described above. The adhesive layer may be formed by coating an adhesive to one of the optical disks on the side formed with layers (e.g., a dye-recording layer, reflective layer, and protective layer) by a spin coat method or the like and stacking the other optical disk on the side formed with the layers or the substrate and by irradiating UV-rays from the opposite side for curing.

In an embodiment of the invention, for the transparent substrate, a resin which has a high transparency with a refractive index to a laser light in a range from 1.4 to 1.6 and which is excellent in the impact resistance is used. Specifically, it is formed by injection molding or other means using a resin such as a polycarbonate, polyolefin, and acryl resin. In this case, tracking guide means of spiral or other shape of guide grooves may be formed. Such tracking guide means can be formed by a known method using a stamper.

Further, the protective film includes, for example, films of polyester, nylon, acetate, or polyolefin such as polyethylene. The film preferably has a thickness, for example, of about 100 μm. Various other materials such as epoxy materials and acrylic materials may also be considered and acrylic materials are preferred among them.

EXAMPLE

The present invention is to be described by way of examples. The examples are not intended to limit the present invention.

Example 1

Provided were two polycarbonate substrates each of 120-mmφ outer diameter, 15-mmφ inner diameter, and 0.6-mm thickness in which guide grooves of 0.3-μm width, 0.16-μm depth, and 0.74-μm track pitch were formed in a range from 46 to 117 mmφ diameter for creating a spiral tracking guide by a stamper (Yubiron™: manufactured by Mitsubishi Gas Chemical Co.). The substrate had a hardness corresponding to a hardness of HB pencil (using Mitsubishi Pencil) and a heat expansion coefficient of 6×10.5/° C. at 20 to 120° C.

0.65 g of a dye (NK-4624, trimethine cyanine, manufactured by Nippon Kanko Shikiso Kenkyusho) was dissolved in 10 ml of diacetone alcohol, which was spin coated to the polycarbonate substrate on the side formed with the guide grooves while properly changing the number of rotation such that the average film thickness was within a range from 40 to 60 nm and dried to form a dye recording layer.

For the dye, when the light absorbance (b) described above showing the dissolving property of the dye was previously measured, it was 0.1. For the measurement, the dye solution described above was coated on a square polycarbonate substrate of 2.5-cm each side and 1-mm thickness by a spin coat method to form a dye recording layer of 100-nm thickness, which was used as a test specimen. 5 mL of hot water of 75° C. was poured into a 50-cc beaker and the test specimen was dipped while keeping the temperature at 75° C. and kept for 60 min. The test specimen was then removed, the resultant colored hot water was cooled to a normal temperature and the light absorbance was measured by a spectrophotometer (manufactured by Hitachi Ltd.).

A reflective layer of 130-nm thickness comprising an alloy film of Ag—Cu—P—Zn (0.79% by weight of elements other than Ag relative to the total amount; 0.5% by weight of Cu, 0.09% by weight of P, and 0.2% by weight of Zn) was formed on the dye recording layer under the presence of P (phosphorus) by a sputtering method of forming a film for each of the alloy components. The composition of the film is shown in Table 1.

Then, unnecessary portions for the dye recording layer and the reflective layer were removed and a dual layer composed of the dye recording layer and the reflective layer was formed concentrically within a diametrical range of from 42 to 118 mmφ.

Another optical disk was manufactured in the same manner and an adhesive comprising a (meth)acrylic UV-curable resin composition (SD-694, manufactured by Dai-Nippon Ink Chemical Co.) was coated to one of the optical disks on the side formed with layers such as a dye recording layer. The other optical disk was opposed and stacked on the side formed with the layers. UV-rays were irradiated by a high pressure mercury lamp at 230 mJ/cm$^2$ to cure the adhesive and form an adhesive layer of 40-μm thickness. The bonded optical disk was thus obtained.

EMF signals were recorded on the bonded optical disk at a line speed of 41.9 m/sec (recording at 12 times speed) by using an optical disk evaluation device manufactured by Pulse Tech Industry Co. (DDU-1000) mounting a semiconductor laser (NA (number of aperture)=0.65). After recording, when signals were reproduced to measure the reflectance, the modulation degree and the PI error were satisfactory and when the jitter was measured, it was 7.1%. Table 1 shows the measured jitter value. Further, as a result of conducting a humidity resistance reliability test, they were satisfactory. The results are shown in Table 1. Jitter was measured after keeping the disk in a thermostable bath at 80° C., 80% RH for 400 hours and evaluated as follows: Before and after the test, those showing no jitter change were favorable and marked with (O), and those showing distinct change were failure and marked with (x). The evaluation criterion for failure (x) was 13% or more for the jitter and 280 or more for PI error.

For examining the physical property of the reflective layer, the nano indentation hardness (a) described above was measured by forming a film at a thickness of 130 nm by a sputtering method on a polycarbonate substrate to measure the hardness (mgf/μm$^2$) by a micro hardness measuring device (Elionix ENT-1100a). Further, for the reflectance of the reflective layer, it was measured by forming a film at a thickness of 130 nm by a sputtering method on a glass substrate and the reflectance (%R) at a wavelength of 660 nm by a spectrophotometer (U-4000, manufactured by Hitachi Ltd.).

Further, for the heat conductivity of the reflective layer, it was measured by forming a film at a thickness of 130 nm on a glass substrate by a sputtering method, measuring the electric resistivity and then determining the heat conductivity (W/m·k) by a Wiedman-Franz method. The results are shown in Table 1.

In view of the result in Table 1, by the incorporation of P, a sufficient hardness at about 110 mgf/μm$^2$ can be obtained even when the addition amount of other metals (Cu, In, Zn, etc.) is decreased. Since the amount of additive elements is small, high reflectance and high thermal conductivity approximate to those of pure silver can be obtained and, as a result, the humidity resistance reliability is favorable and the jitter rate at 12 times speed is also lowered and satisfactory.

Example 2, Comparative Examples 1 to 4

Bonded optical disks were manufactured by using the same dye, adhesives and substrates as those in Example 1 except for using alloy films of compositions shown in Table 1. Further, reflective layers of the alloy film and silver film were formed for measuring the physical property in the same manner as in Example 1 and they were measured in the same manner as in Example 1. The results are shown in Table 1.

Examples 3, 4

Bonded optical disks were manufactured in the same manner as in Example 1 except for using those of physical properties shown in Table 2 for the adhesive layer and measurement was conducted also in the same manner as in Example 1. The results are shown in Table 2.

Further, when the characteristics (e) described above were examined for each of the bonded optical disks, the adhesion strength (peeling strength) was shown in Table 2 and the optical disks were peeled. In the measurement, after inserting a rigid iron piece of 0.1-mm thickness into a gap at the inner circumference between the substrates and gripping and fixing the upper substrate at the periphery thereof, load was applied to the iron piece (each by 10 g), and the load just before the peeling of the substrates was read.

Further, the same adhesive layer as described above was prepared by using SD-694 and irradiating UV-rays in the same manner as described above to obtain test specimens, and the physical property values (c) and (e) described above were determined by measuring the temperature dispersion behavior of the module of elasticity by a dynamic viscoelastic method. A specific measurement was conducted in accordance with JIS-K6251. The results are shown in Table 2.

Comparative Examples 5 to 9

Bonded optical disks were manufactured in the same manner as in Comparative Example 3 except for using those of the physical property shown in Table 2 for the adhesive layer and measurement was conducted also in the same manner as in Example 1. The results are shown in Table 2.

Table 2 also shows the results of determining the physical property values (c), (d), and (e) described above in the same manner as in Examples 3 and 4.

For the water solubility of the dye, the absorbance was 10% in the examples and the comparative examples.

light through the transparent substrate, wherein the reflective layer is comprised of a metal film containing a phosphorus component.

2. The optical information recording medium according to claim 1, wherein the reflective layer has a hardness of 60 mgf/$\mu m^2$ or more as nano indentation hardness.

3. The optical information recording medium according to claim 1, wherein the dye recording layer has a dye dissolving property to water such that after the dye recording layer is dipped in 5 ml of hot water at 75° C. for 60 min, an absorbance of the hot water at a maximum absorbance wavelength is 20% or less.

4. An optical information recording medium comprising (i) a first transparent substrate, (ii) layers including a dye recording layer and a reflective layer formed on the first substrate in this order, (iii) an adhesive layer formed on the reflective layer, and (iv) a second transparent substrate

TABLE 1

|  | Example | | Comparative Example | | | |
| --- | --- | --- | --- | --- | --- | --- |
|  | 1 | 2 | 1 | 2 | 3 | 4 |
| Film composition of reflection layer | Ag—Cu—P—Cu | Ag—Cu—P—In | Ag | Ag—Cu—Pd | Ag—Cu—Zn | Ag—Cu—Nd |
| Addition amount of elements other than Ag (wt % based on Ag) | Cu: 0.5<br>P: 0.09<br>Zn: 0.2 | Cu: 0.5<br>P: 0.09<br>Zn: 0.2 | P none | Cu: 1.0<br>Pd: 1.0<br>P: none | Cu: 1.0<br>Zn: 1.0<br>P: none | Cu: 1.0<br>Nd: 1.0<br>P: none |
| Total addition amount other than Ag (wt %) | 0.79 | 0.79 | 0 | 2.0 | 2.0 | 2.0 |
| Hardness (mgf/$\mu m^2$) | 112 | 109 | 57 | 115 | 120 | 133 |
| Reflectance (% R) (wavelength: 660 nm) | 97 | 97 | 98 | 95 | 95 | 95 |
| Heat conductivity (W/m · k) | 330 | 315 | 410 | 295 | 290 | 145 |
| Humidity resistant reliability test | ○ | ○ | x | ○ | ○ | 88 |
| Initial jitter (%) (12 times speed) | 7.1 | 7.2 | 7.0 | 7.7 | 7.7 | 8.5 |

TABLE 2

|  | Example | | Comparative Example | | | | |
| --- | --- | --- | --- | --- | --- | --- | --- |
|  | 3 | 4 | 5 | 6 | 7 | 8 | 9 |
| Glass transition temperature (Tg) (° C.) | 180 | 196 | 180 | 180 | 100 | 80 | 150 |
| Elastic Modulus 25° C. (Mpa) | 3200 | 3500 | 3200 | 3200 | 1300 | 1500 | 2000 |
| 80° C. | 2100 | 2000 | 2100 | 2100 | 460 | 1000 | 800 |
| Humidity resistance reliability test | ○ | ○ | ○ | ○ | x | x | x |
| Initial jitter (%) (12 time speed) | 7.1 | 7.2 | 7.7 | 7.0 | 8.35 | 8.7 | 8.17 |
| Adhesion strength (N) (peeling strength) | 7 | 11.1 | 7 | 11.1 | 9.1 | 12.7 | 9.5 |

The present application claims priority to Japanese Patent Application No. 2004-286295, filed Sep. 30, 2004, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium comprising a transparent substrate and layers including a dye recording layer and a reflective layer formed on the transparent substrate in this order, wherein information can be recorded on or reproduced from the dye recording layer by irradiation of light through the transparent substrate, wherein the reflective layer is comprised of a metal film containing a phosphorus component.

formed on the reflective layer via the adhesive layer, wherein information can be recorded on or reproduced from the dye recording layer by irradiation of light through the first transparent substrate, wherein the reflective layer is composed of a metal film containing a phosphorus component and the reflective layer has a hardness of 60 mgf/$\mu m^2$ or more as nano indentation hardness.

5. The optical information recording medium according to claim 4, wherein the adhesive layer has an elastic modulus which changes in relation to a temperature and shows a glass transition temperature of 100° C. or higher but 200° C. or lower.

6. The optical information recording medium according to claim 5, wherein the elastic modulus of the adhesive layer is 1000 MPa or more at 25 to 80° C.

7. The optical information recording medium according to claim 4, wherein the dye recording layer has a dye dissolving property to water such that after the dye recording layer is dipped in 5 ml of hot water at 75° C. for 60 min, an absorbance of the hot water at a maximum absorbance wavelength is 20% or less.

8. The optical information recording medium according to claim 4, wherein the adhesive layer has an adhesion strength property such that a load value for initiating peeling of the second transparent substrate from the underlying layer is 4 N or more as measured when a rigid thin film metal piece is inserted between the second transparent substrate and the underlying layer at an inner circumference thereof.

9. An optical information recording medium comprising (A) a pair of disks, each comprising: (i) a first transparent substrate and (ii) layers including a dye recording layer and a reflective layer formed on the first substrate in this order, and (B) an adhesive layer which bonds the pair of disks wherein respective sides where the reflective layers are formed face each other, wherein information can be recorded on or reproduced from the respective dye recording layers by irradiation of light through the respective transparent substrates, each respective reflective layer being composed of a metal film containing a phosphorus component and having a hardness of 60 mgf/μm² or more as nano indentation hardness.

10. The optical information recording medium according to claim 9, wherein each adhesive layer has an elastic modulus which changes in relation to a temperature and shows a glass transition temperature of 100° C. or higher but 200° C. or lower.

11. The optical information recording medium according to claim 10, wherein the elastic modulus of the adhesive layer is 1000 MPa or more at 25 to 80° C.

12. The optical information recording medium according to claim 9, wherein each dye recording layer has a dye dissolving property to water such that after the dye recording layer is dipped in 5 ml of hot water at 75° C. for 60 min, an absorbance of the hot water at a maximum absorbance wavelength is 20% or less.

13. The optical information recording medium according to claim 9, wherein the adhesive layer has an adhesion strength property such that a load value for initiating peeling of the pair of disks from each other is 4 N or more as measured when a rigid thin film metal piece is inserted between the pair of discs at an inner circumference thereof.

* * * * *